United States Patent [19]

Ide

[11] Patent Number: 5,359,384
[45] Date of Patent: Oct. 25, 1994

[54] CAMERA AND CAMERA CONTROL UNIT
[75] Inventor: Masataka Ide, Hachioji, Japan
[73] Assignee: Olympus Optical Co. Ltd., Tokyo, Japan
[21] Appl. No.: 20,154
[22] Filed: Feb. 19, 1993
[30] Foreign Application Priority Data
  Feb. 18, 1992 [JP] Japan .................. 4-30958
[51] Int. Cl.⁵ .................. G03B 13/36; G03B 17/38
[52] U.S. Cl. .................. 354/403; 354/219; 354/266
[58] Field of Search .................. 354/219, 266, 403

[56] References Cited
U.S. PATENT DOCUMENTS

| | | | |
|---|---|---|---|
| 4,998,125 | 3/1991 | Watanabe et al. | 354/403 |
| 5,014,080 | 5/1991 | Miyadera | 354/403 |
| 5,138,354 | 8/1992 | Okada et al. | 354/219 X |
| 5,172,155 | 12/1992 | Kosaka | 354/403 |
| 5,247,327 | 9/1993 | Suzaka et al. | 354/403 |

FOREIGN PATENT DOCUMENTS 1-42639 2/1989 Japan .
2-281246 11/1990 Japan .

Primary Examiner—W. B. Perkey
Attorney, Agent, or Firm—Louis Weinstein

[57] ABSTRACT

A first light-receiving element receives a remote control signal from a remote control unit, and a second light-receiving element receives the light of a human body detection signal, which has been sent from a light-projecting element, reflected from a user's face. The outputs of these first and second light-receiving elements are detected by a single, common detecting circuit. Thereby, the circuitry in a camera having both a remote control function and an eye start function is downsized to realize cost savings.

26 Claims, 14 Drawing Sheets

FIG.1
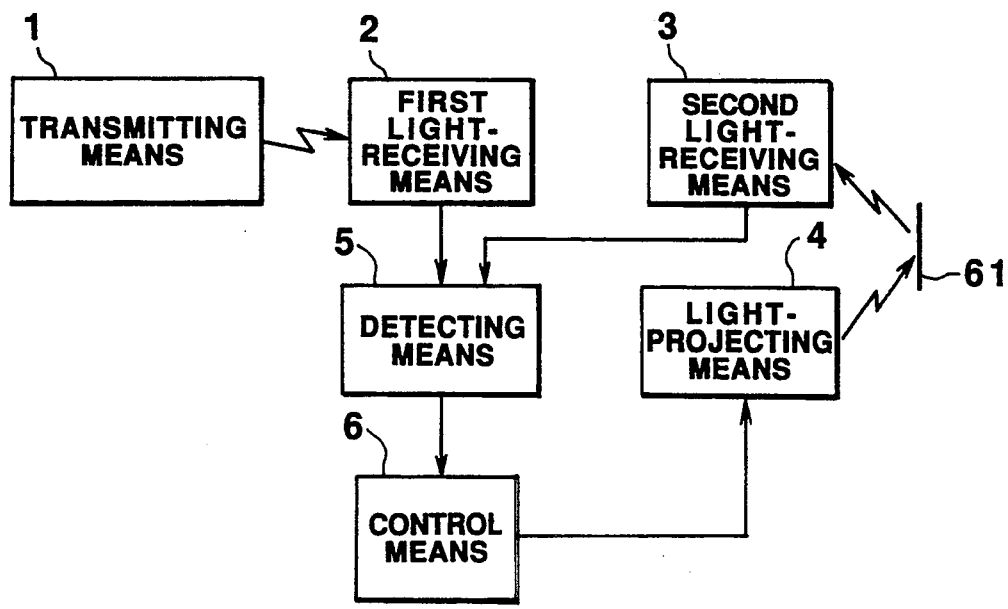
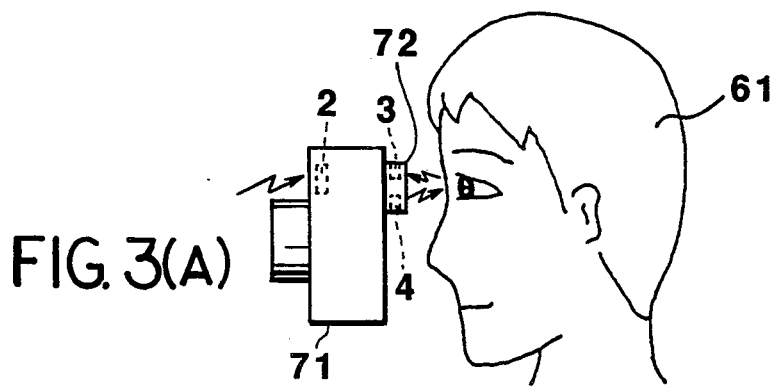
FIG. 3(A)
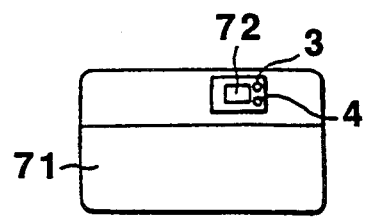
FIG. 3(B)

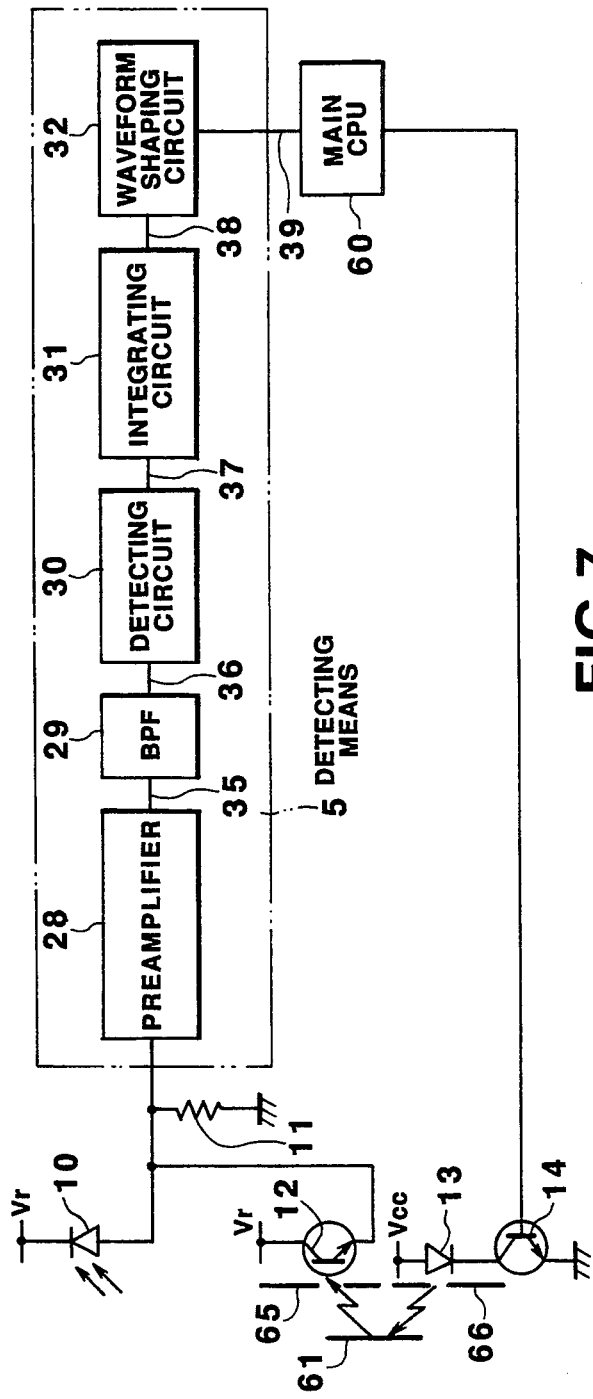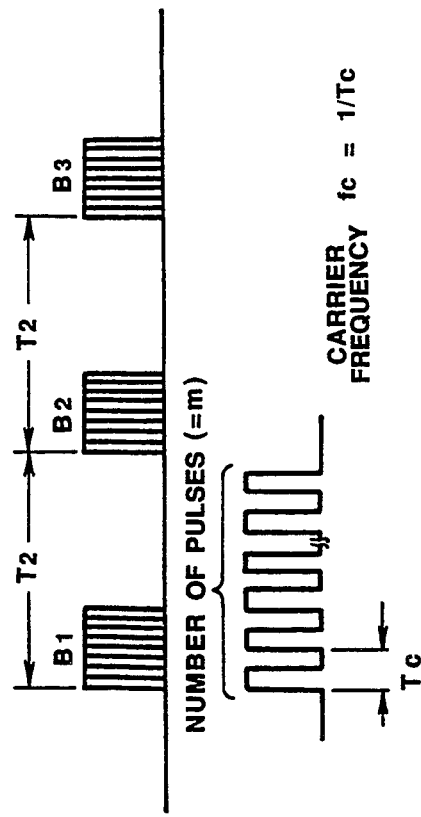

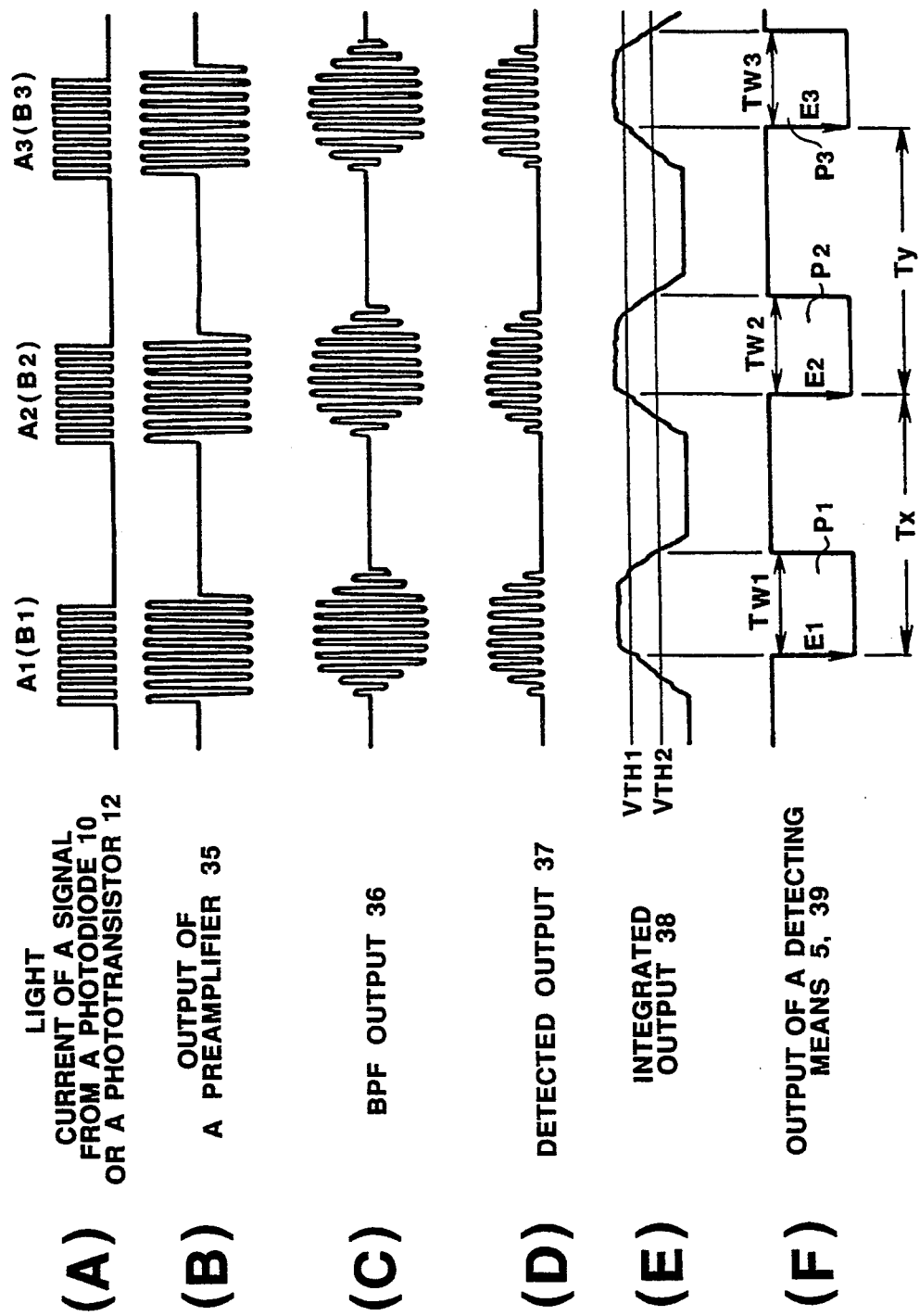

CAMERA AND CAMERA CONTROL UNIT

BACKGROUND OF THE INVENTION

FIELD OF THE INVENTION

The present invention relates to a camera having a so-called remote control function that transmits a transmitted signal from a transmitting means located far from a camera and controls the operations of the camera, and a so-called eye start function that detects a photographer's action of looking into a viewfinder and starts the camera operations, and to a camera control unit.

DESCRIPTION OF THE RELATED ART

A camera, which has a remote control function that transmits a remove control signal from a transmitting means located far from a camera and controls the operation of a camera such as a release operation or mode switching, has been well-known in the past. Various proposals including a proposal made in, for example, Japanese Patent Laid-Open No. 2-281246 have been offered. Infrared light is usually employed as a remote control signal for this kind of camera, because infrared light is cheap, does not affect a human body adversely, and causes less disturbance.

On the other hand, a camera that starts operations when an eye start function detects a photographer's action of looking into a viewfinder and that consequently shortens a release time lag, has already been known. The present applicant has proposed this kind of camera in Japanese Patent Laid-Open No. 64-42639. The proposed camera has an infrared-light projecting system and an infrared-light receiving system, and detects a photographer's action of looking into a viewfinder by recognizing that infrared light projected by the infrared-light projecting system has entered the infrared-light receiving system after reflecting from a human body.

To realize a camera including both the remote control function and the eye start function, both a remote control detecting circuit for detecting a remote control signal and an eye start detecting circuit for detecting light reflected from a human body must be incorporated in the camera. The incorporation of both circuits expands the size of circuitry, and increases the cost. A compact camera or other low-price camera can hardly include these two functions.

OBJECTS AND SUMMARY OF THE INVENTION

An object of the present invention is to provide a camera and a camera control unit In which the circuitry in a camera having a remote control function and an eye start function can be downsized to realize cost saving.

Another object of the present invention is to provide a camera and a camera control unit in which detection sensitivity is improved by selectively performing detection of a remote control signal or detection of a human body, and software can be shared by adopting the same signaling pattern for the remote control signal and human body detected signal.

Another object of the present invention is to provide a camera and a camera control unit in which a usable range of remote control can be expanded for a camera having a remote control function and an eye start function by enabling a light-receiving element for eye start detection installed on the back of the camera to receive a remote control signal sent from a remote control unit located far behind the camera.

A camera control unit of the present invention comprises a remote control for remotely controlling camera operations, a first light-projecting means that is incorporated in the remote control and transmits a first light signal, a first light-receiving means that is installed on the front of a camera body and receives the first light signal, a second light-projecting means that is installed on the back of the camera body and transmits a second light signal whose state differs from that of the first light signal, a second light-receiving means that is installed on the back of the camera body and receives that light of the second light signal reflected from a camera user, a detecting means that is connected to the first light-receiving means and to the second light-receiving means, determines which is Input; the first light signal or the second light signal, and provides an output, and a control means that controls camera operations in receipt of the output of the detecting means.

A camera of the present invention comprises a first light-receiving element that receives infrared light projected by a remote control unit and outputs a light current signal, a light-projecting element that projects infrared light toward a direction behind a camera body, a second light-receiving element that receives the infrared light, which has been projected by the light-projecting element, reflected from a photographer's face, and that outputs a light current signal, a converting circuit that is connected to the first and second light-receiving elements, and that converts light current signals output by the two light-receiving elements into digital pulse signals, and a control means that is connected to the converting circuit, that determines from which a digital pulse signal is derived; an output of the first light-receiving element or an output of the second light-receiving element, and that controls the subsequent camera operations in accordance with the result of the determination.

The above, as well as other features and advantages of the present invention will be apparent from the description below.

BRIEF DESCRIPTION OF THE DRAWINGS

FIG. 1 is a block construction diagram of a major portion of a camera representing a first embodiment of the present invention;

FIGS. 3a and 3b respectively show a lateral view and a back view of a camera for explaining a layout of the first and second light-receiving means and light-projecting means, which are shown in FIG. 2, in a camera;

FIG. 6 is a block construction diagram showing the details of the first and second light-receiving means and light-projecting means shown in FIG. 1;

FIG. 7 shows a waveform of a light-projecting pulse train provided by the light-projecting means shown in FIG. 6;

FIG. 8 shows waveforms of signals sent from the components shown in FIG. 6;

DETAILED DESCRIPTION OF THE PREFERRED EMBODIMENTS

FIG. 1 shows the first embodiment of the present invention. First, prior to the description of embodiments of the present invention, all the electric circuits in a camera to which the present Invention applies and the locations of light-projecting means and light-receiving means in a camera will be described in conjunction with FIGS. 2 and 3 respectively.

Figure 2:
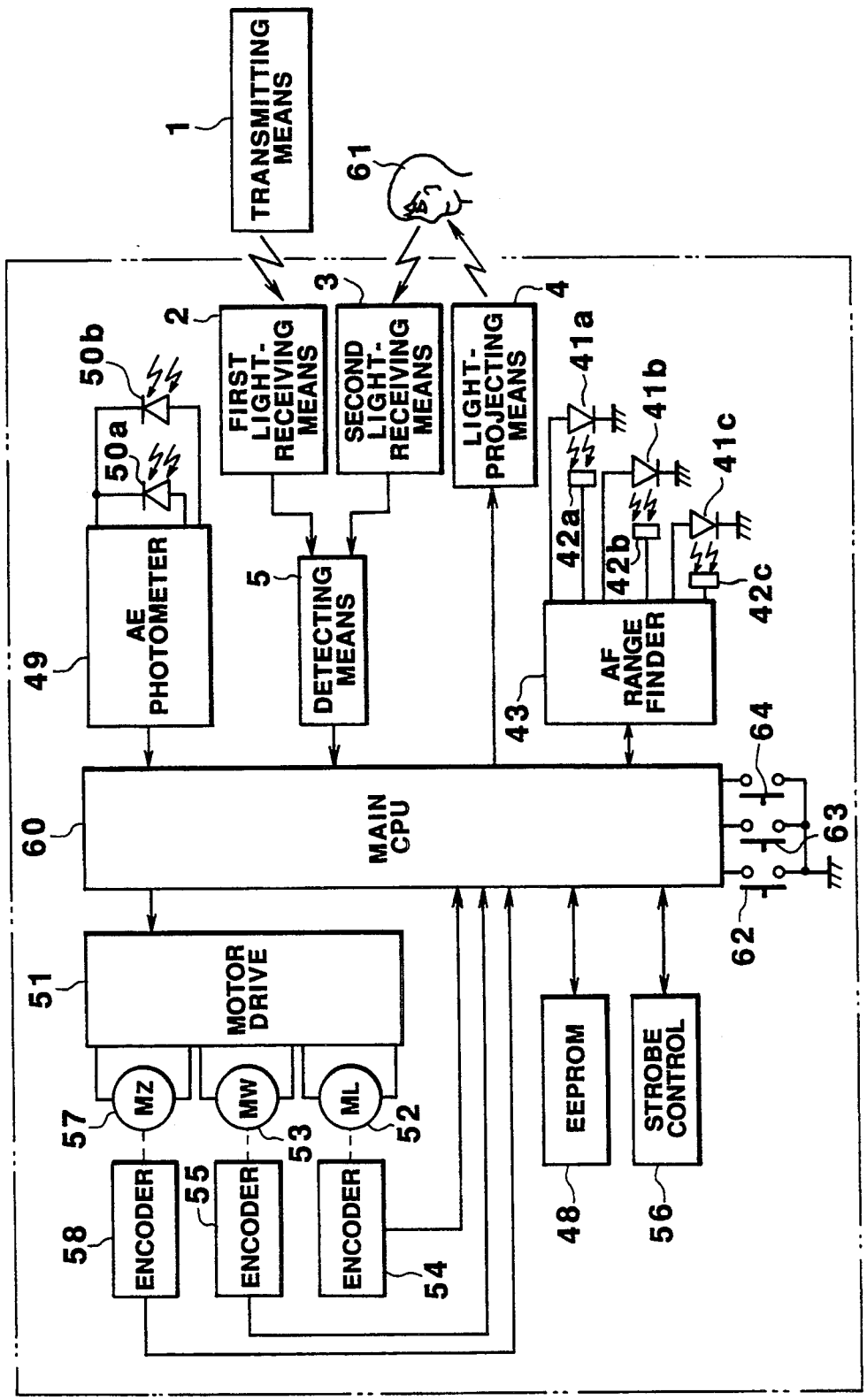
FIG. 2 is a block diagram of all electric circuits in a camera to which the present invention applies.

In FIG. 2, a main CPU 60 uses programs existent in a ROM incorporated therein to sequentially control the component blocks in a camera, and thereby controls the operations of peripheral blocks.

An AF range finder 43 measures a distance to a subject in accordance with an infrared-light active procedure, and outputs measured subject distance information to the main CPU 60. The AF range finder 43 is connected to IREDs 41a, 41b, and 41c, and to PSDs 42a, 42b, and 42c. The AF range finder 43 uses the PSDs 42a, 42b, and 42c to receive the light of infrared light, which have been emitted by the IREDs 41a, 41b, and 51c, reflected from a subject, and measures the distance to the subject.

An EEPROM 48 is a nonvolatile memory element, wherein adjustment data is stored in advance during production. When range finding data is converted into lens position data, the adjustment data is used to compensate for an error resulting from a mechanical variation in the position of a lens. When adjustment data is transferred from the EEPROM 48 to the main CPU 60, the main CPU 60 uses the range finding data and the adjustment data read from the EEPROM 48 to calculate a lens position.

An AE photometer 49 meters the luminance of a subject. Light-receiving elements 50a and 50b serve as sensors for metering the luminance of a subject. The sensors output light current associated with the luminance of a subject to the AE photometer 49. Then, the AE photometer 49 outputs photometric data based on the light current to the main CPU 60. Based on the photometric data, the main CPU 60 recognizes a backlighted state or computes an exposure value.

A motor drive 51 drives a lens motor 52 for driving a lens and a shutter, a zoom motor 57 for driving a zoom lens, and a film feed motor 53. Encoders 54, 58, and 55 detect the rotational positions of the lens motor 52, zoom motor 57, and film feed motor 53 respectively, and output the detected data to the main CPU 60. The main CPU 60 feeds back the outputs of these encoders 54, 58, and 55 to the motor drive 51.

A strobe control 56 starts charging a main capacitor, which is not shown, in response to a signal from the main CPU 60, and outputs a signal representing completion to the main CPU 60 after completing the charging. Then, the main CPU 60 outputs a charge stop signal to the strobe control 56. The main CPU 60 also outputs a light-emission timing signal to the strobe control 56, and controls light emission of a strobe. Switches 62, 63, and 64 are a first release switch, a second release switch, and a remote control mode setting switch.

A transmitting means 1 transmits remote control signal light for remotely controlling camera operations. A first light-receiving means 2 receives the remote control signal light. A light-projecting means 4 projects, for example, infrared light on a human body 61. A second light-receiving means 3 receives light reflected from the human body 61. In this embodiment, the outputs of the first and second light-receiving means 2 and 3 are fed to a detecting means 5. The detecting means 5 can detect either a remote control signal or a signal of light reflected from a human body. The transmitting means 1, first light-receiving means 2, second light-receiving means 3, light-projecting means 4, and detecting means 5 will be detailed in conjunction with FIG. 1 later.

FIGS. 3A and 3B are a side view and a back view of a camera respectively, showing an example of a layout of a first light-receiving means 2, a second light-receiving means 3, and a light-projecting means 4, which are shown in FIG. 2, in a camera body 71. The second light-receiving means 3 and light-projecting means 4 are installed near a viewfinder window 72 on the back of the camera body 71. Normally, a photographer looks into the viewfinder window 72 of a camera as shown in FIG. 3A. Therefore, infrared light emitted from the light-projecting means 4 is reflected from a human body 61, and received by the second light-receiving means 3.

On the other hand, the first light-receiving means 2 is arranged on the front of the camera. Therefore, the photographer can remotely control release and other camera operations using a transmitting means 1 from ahead of the camera.

FIG. 1 is a block construction diagram of a major portion of a camera representing the first embodiment of the present invention. A transmitting means 1 remotely controls a camera at a position away from the camera. Remote control signal light emitted by the transmitting means 1 is received by a first light-receiving means 2. A detecting means 5 detects the remote control signal light emitted by the transmitting means 1 by checking an output of the first light-receiving means 2, and outputs a remote control detected signal to a control means 6. The control means 6 checks the output of the detecting means 5 for a pulse spacing T1 which will be described in conjunction with FIG. 5 later, determines that remote control signal light has been emitted from the transmitting means 1, and controls camera operations. An embodiment of the control means 6 is a main CPU 60 in FIG. 2.

A light-projecting means 4 is controlled by the control means 6, and projects infrared light for human body detection. When a photographer looks into a viewfinder, the infrared light for human body detection, which is projected by the light-projecting means 4, reflects from a human body 61 and enters a second light-receiving means 3. The second light-receiving means 3 provides the detecting means 5 with an output based on the incident light of the human body. The detecting means 5 detects signal light, which has been emitted by the light-projecting means 4, reflected from the human body 61, by checking the output of the second light-receiving means 3, and outputs an eye start detected signal to the control means 6. The control means 6 checks the output of the detecting means 5 for a pulse spacing T2 which will be described in conjunction with FIG. 7 later, determines that the a light projected signal has been sent from the light-projecting means 4, and then starts camera operations.

As mentioned above, remote control signal light emitted by a transmitting means 1, and signal light for human body detection, which has been emitted by a light-projecting means 4 and reflected from a human body when a photographer looks into a viewfinder, are received by first and second light-receiving means 2 and 3. In the prior art, as described previously, light reception by the first and second light-receiving means 2 and 3 have been detected by independent detecting circuits. In this embodiment, a detecting means 5 is used in common for the detection, and a control means 6 determines from which received light, the signal originates.

Figure 4:
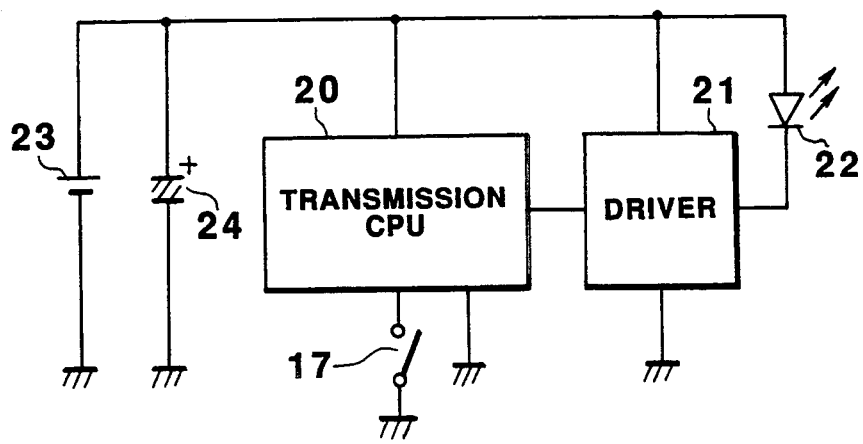
FIG. 4 is a block construction diagram showing the details of the transmitting means shown in FIG. 1.

FIG. 4 is a block construction diagram for explaining the details of an electrical construction of a transmitting means 1, which is shown in FIG. 1, for transmitting remote control signal light used to remotely control camera operations. When a transmission switch 17 is turned on, a transmission CPU 20 executes a program existent in a ROM therein, and generates a signaling pattern for a transmitted remote control signal. A driver 21 drives an infrared emitting diode (hereafter, IRED) 22 in accordance with the signaling pattern, and outputs a remote control signal of infrared light.

Figure 5:
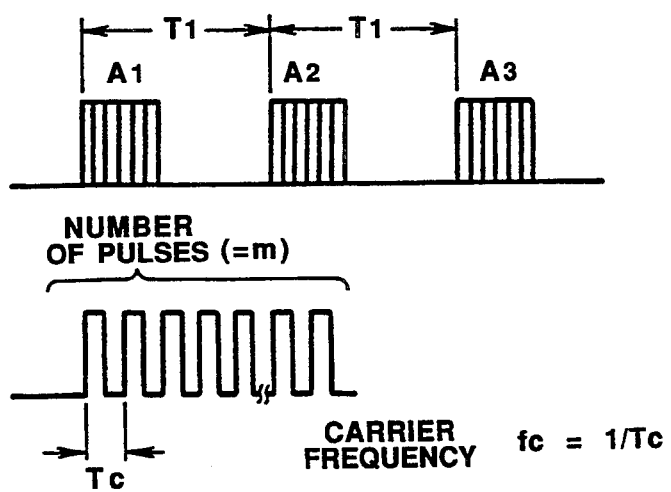
FIG. 5 shows a waveform of the transmitted pulse train is shown in FIG. 4.

The remote control signal, as shown in FIG. 5, is a signal produced by modulating the pulses of a carrier with a frequency fc ($=1/Tc$). In the remote control signal, pulse trains A1 to A3, each of which has a given number of pulses, m, are arranged In given spacings T1. The transmitting means 1 is designed compactly so as to be freely detachable from a camera body, and has a built-in coin type lithium battery 23.

Normally, the coin type lithium battery 23 has a high internal impedance and cannot supply current of 0.5 to 1 A directly to the IRED 22. Therefore, a low-impedance capacitor 24 is connected in parallel with the battery 23 in a bid to drive the IRED 22. Drive current is supplied from the capacitor 24 to the IRED 22.

FIG. 6 is a block diagram for explaining the details of the electric constructions of a first light-receiving means 2, second light-receiving means 3, light-projecting means 4, and detecting means 5, which are shown in FIG. 1. The first light-receiving means 2 corresponds to a photodiode 10 in FIG. 6. The second light-receiving means 3 corresponds to a phototransistor 12 in FIG. 6. The light-projecting means 4 corresponds to an IRED 13 in FIG. 6. The detecting means 5 corresponds to a circuit block in FIG. 6 made up of a preamplifier 28, a bandpass filter (hereafter, BPF) 29, a detecting circuit 30, an integrating circuit 31, and a waveform shaping circuit 32. The photodiode 10 and phototransistor 12 are sensitive only to an infrared light wavelength region.

The cathode of the photodiode 10 for receiving remote control signal light emitted from a transmitting means 1, which is not shown, is connected to a stabilized constant-voltage source Vr. A load resistor 11, which converts light current flowing through the photodiode 10 into a voltage signal, is connected between the anode of the photodiode 10 and a reference potential point. A voltage signal occurring across the resistor 11 is fed to the detecting means 5.

The IRED 13 corresponding to the light-projecting means 4 is driven when a driving transistor 14 is turned on with a drive signal sent from a main CPU 60. A light projected signal from the IRED 13 has a similar signaling pattern as that of a remote control signal shown in FIG. 5 but differs in pulse spacing from the remote control signal. Specifically, the light projected signal from the IRED 13 is, as shown in FIG. 7, produced by modulating the pulses of a carrier with a frequency fc. In the light projected signal, pulse trains B1 to B3, each member of which consists of m pulses each having a period 1/Tc, are arranged in spacings T2. The main CPU 60 instructs the IRED 13 to transmit a unit of pulse trains B1 to B3 repeatedly at given time intervals.

The collector of the phototransistor 12 corresponding to the second light-receiving means 3 is connected to the stabilized constant-voltage source Vr, and the emitter thereof is connected to a junction between the photodiode 10 and the load resistor 11, and to an input terminal of the detecting means 5. In other words, the photodiode 10 and phototransistor 12 are connected in parallel with each other; that is, wired-ORed. The output of wired OR is fed to the detecting means 5. Diaphragms 66 and 65 for removing, for example, noises of disturbance are placed in front of the IRED 13 and phototransistor 12 respectively.

FIGS. 8A to 8F show waveforms of signals sent from the components of a detecting means 5. A preamplifier 28 possesses a property of a high-pass filter (hereafter, HPF), removes a fixed light component or a noise caused by a mains frequency light source from the light current flowing through the photodiode 10 or phototransistor 12 (FIG. 8A), and amplifies and outputs only the light current of a signal as shown in FIG. 8B.

A BPF 29 stationed In the next stage is constructed so that its center frequency determining the BPF property thereof will be equal to a carrier frequency fc of a remote control signal sent from the transmitting means 1 or a light projected signal sent from the IRED 13. With the center frequency fc, the BPF 29 has a peak voltage gain and removes frequency components on either side of a passage band surrounding the center frequency fc. An output 36 of the BPF 29 shown in FIG. 8C is red to a detecting circuit 30. Then, a detected output shown in FIG. 8D is input to an integrating circuit 31.

The integrating circuit 31 integrates signal components, and removes a carrier component at the same time. An output 38 of the integrating circuit 31 has a waveform shown in FIG. BE. The output 38 is fed to a waveform shaping circuit 32, wherein the waveform thereof is shaped as shown in FIG. 8F with respect to threshold levels $V_{TH1}$ and $V_{TH2}$ which cover a hysteresis. Then, the output whose waveform has been shaped is supplied to a main CPU 60.

As described above, the light current of an output from a photodiode 10 provides in response to remote control signal light from a transmitting means 1, which is shown in FIG. 8A, or the light current of an output from a phototransistor 12 provides in response to the light of a light projected signal, which has been transmitted by an IRED 13, reflected from a human body, which is shown in FIG. 8A, is converted into a pulse signal consisting of pulses P1, P2, and P3, shown in FIG. 8F.

The main CPU 60 reads a period Tx from the leading edge E1 of the signal pulse P1 to the leading edge E2 of the next signal pulse P2, and also reads a period Ty from the leading edge E2 of tile signal pulse P2 to the leading edge E3 of the signal pulse P3. Then, the main CPU 60 recognizes that Tx or Ty equals to a given pulse spacing T1 or T2, and that each of the pulse widths Tw1 to Tw3 of the pulses P1 to P3 exceeds a given value. Then, the main CPU 60 determines whether the pulse signal is a remote control signal sent from the transmitting means 1, a light projected signal sent from the IRED 13, or a noise. Based on the result of the determination, the main CPU 60 controls camera operations.

Next, the operations of a camera of the first embodiment having the aforesaid construction will be described with reference to the flowcharts of FIGS. 9 and 10. For convenience sake, the flow of the operations of this embodiment is divided into FIGS. 9 and 10. Encircled numerals 1 to 4 at terminals in FIGS. 9 and 10 indicate correspondences between the drawings.

In a camera of this embodiment, the lens barrel enclosing a lens collapses in a standby state. With first release or an eye start function actuated, the lens moves to a photographic region.

Figure 9:
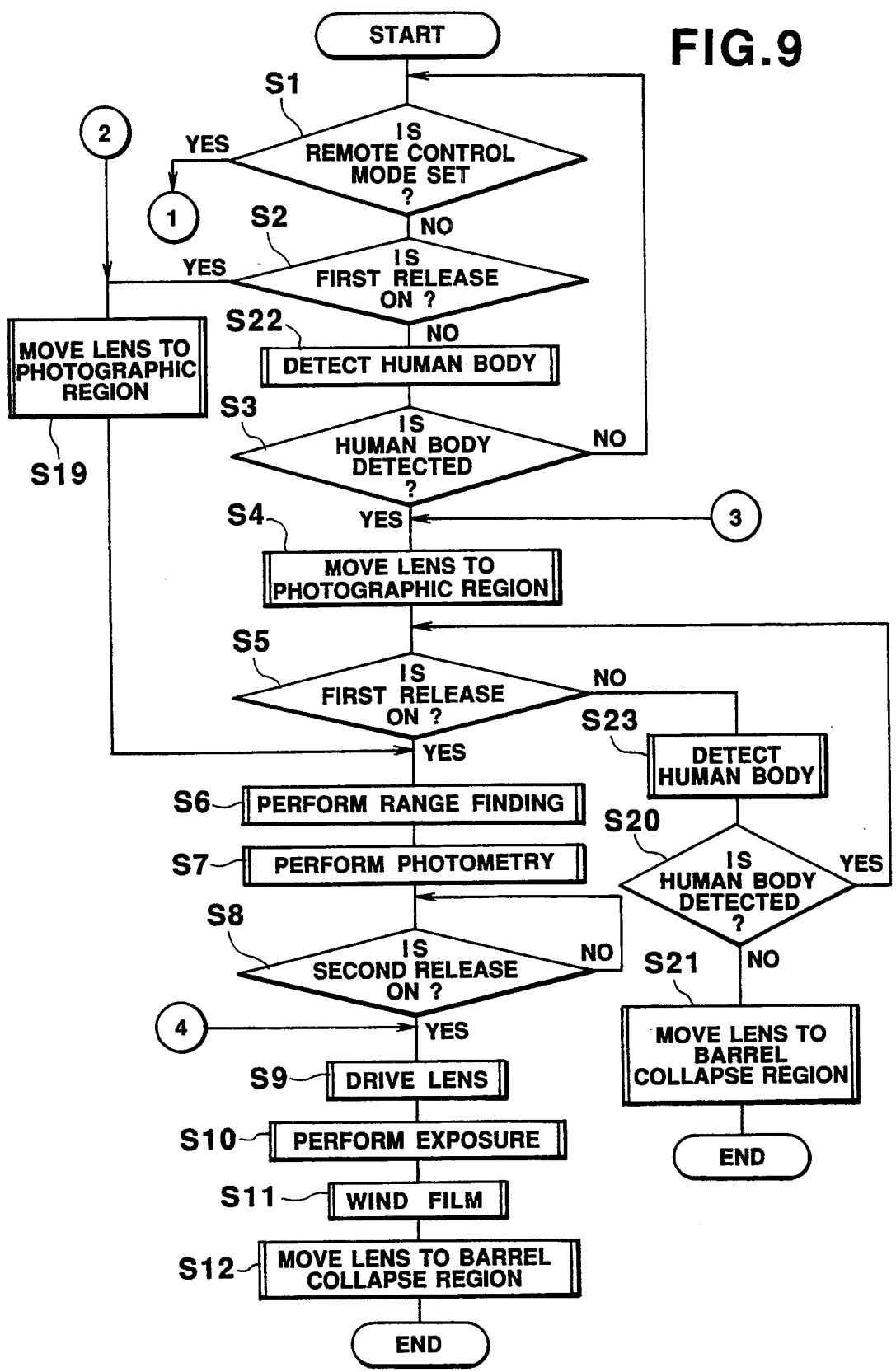
FIG. 9 is a flowchart of camera operations in the first embodiment.

When the flow of FIG. 9 starts, first, a main CPU 60 checks if a remote control mode switch 64 (See FIG. 2) and a first release switch 62 are turned on, and detects a photographer's action against the camera (steps S1 and S2). At this stage, the main CPU 60 instructs an IRED 13 to project light. Moreover, the main CPU 60 checks (step S3) if a human body is detected because the photographer has looked into a viewfinder (step S22). The main CPU 60 repeats the operations of the steps S1, S2, S22, and S3, and stays in the standby state until a human body is detected.

When the photographer turns on the first release switch 62, unless a remote control mode is designated, processing is advanced from the step S2 to a step S19. When the remote control mode is designated, processing is advanced from a step S14 to the step S19 via the steps S1, S24, and S13. In other words, when first release is carried out manually, the lens is moved from a barrel collapse region to the photographic region at the step S19. Thereafter, range finding and photometry are executed (steps S6 and S7). Then, a second release wait state is set (step S8).

On the other hand, when the photographer looks into the viewfinder, a human body is detected (step S22 or S3). Then, even when first release is not carried out at the step S2 or S14, the lens is moved to the photographic region at the step S4 (eye start). In this case, at the next step S5, a first release wait state is set. After first release is carried out, range finding and photometry are executed (steps S6 and S7). Then, the second release wait state is set (step S8).

Although eye start is executed, if first release is not turned on at the step S5, human body detection is rerun (step S23). When the photographer is still looking into the viewfinder, the first release wait state is set again. When the photographer is not looking into the viewfinder, the lens is moved to the barrel collapse region (step S21). Then, the flow terminates.

In the second release wait state of the step S8, when the photographer turns on the second release switch, lens drive, exposure, and film winding are executed sequentially (steps S9 to S11). Finally, the lens is moved from the photographic region to the barrel collapse region (step S12). Thus, a sequence of operations terminates.

Next, assuming that a photographer turns on a remote control mode switch 64 to designate the remote control mode at the step S1, a standby state is set to wait for input of a remote control signal at the steps S24 and S13. With the input of a remote control signal sent from a transmitting means shown in FIGS. 1 to 4, the lens is moved to the photographic region, and range finding and photometry are executed (steps S16 to S18). At the steps S9 to S12 in FIG. 9, a series of operations; such as, lens drive, exposure, film winding, and barrel collapse are executed to terminate this flow.

Next, referring to FIGS. 16 and 17, a subroutine for detecting a human body, which involves the steps S22, S23, and S25, will be described. Encircled numerals 5 and 6 at terminals in FIGS. 16 and 17 indicates correspondences between these drawings.

In the subroutine Human Body Detection, when a human body is detected, an E flag is set to 1. When a human body is not detected, the E flag is reset to 0. In the flow of FIGS. 9 and 10, the E flag is referenced at the step S3, S20, or S15 in order to determine whether a human body is detected. Then, control is branched. A carrier component of a light projected signal sent from an IRED 13 shown in FIG. 6 is generated in accordance with the timing specified by a timer of hardware inside the main CPU 60. When software instructs light projection, the IRED 13 generates a single pulse train B (FIG. 7).

Within the subroutine Human Body Detection, light projection is repeated while light reflected from a human body (eye start signal) is being detected, then the reflected light is checked for a pulse spacing T2 to determine whether a photographer is looking into the viewfinder. To be more specific, the CPU 60 inputs an output 39 of a detecting means 5 shown in FIG. 6, and detects that the leading edge E1 (E2 or E3) of a pulse P1 (P2 or P3) shown in FIG. 8F is present within a given period TE from the start of light projection represented by the light projected signal sent from the IRED. Thereby, the CPU 60 determines whether the pulse spacing between each pair of the pulses P1, P2, and P3 is T2. For determining whether the pulses P1 to P3 are required pulses, threshold levels Twm and Twn having a relationship of Twm > Twn are specified for the pulse widths Tw1, Tw2, and Tw3. Then, it is checked if Twm > Tw1, Tw2, Tw3 > Twn is established.

Figure 16:
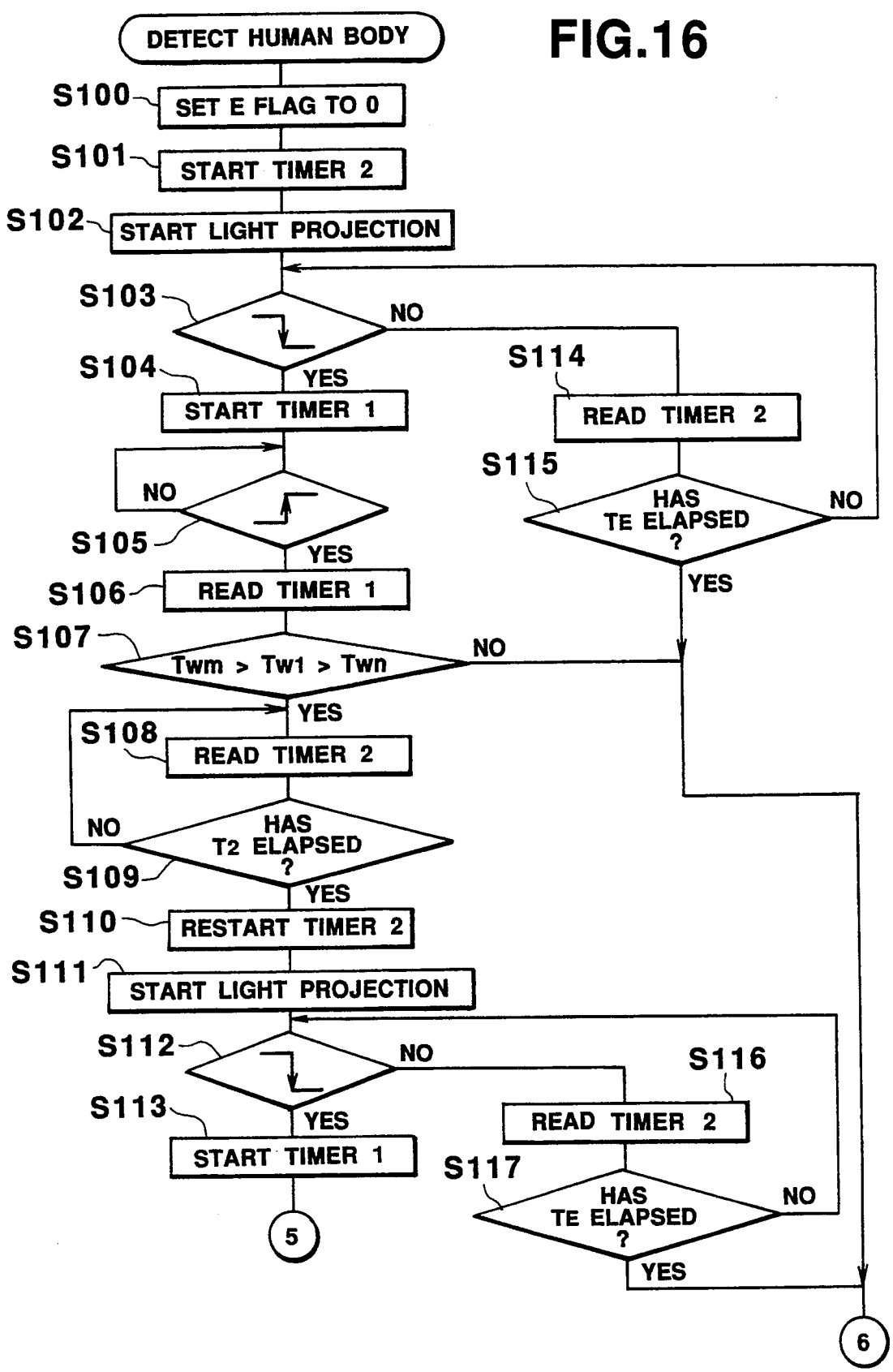
FIG. 16 is a flowchart showing a human body detection routine in the first embodiment of the present invention.
Figure 17:
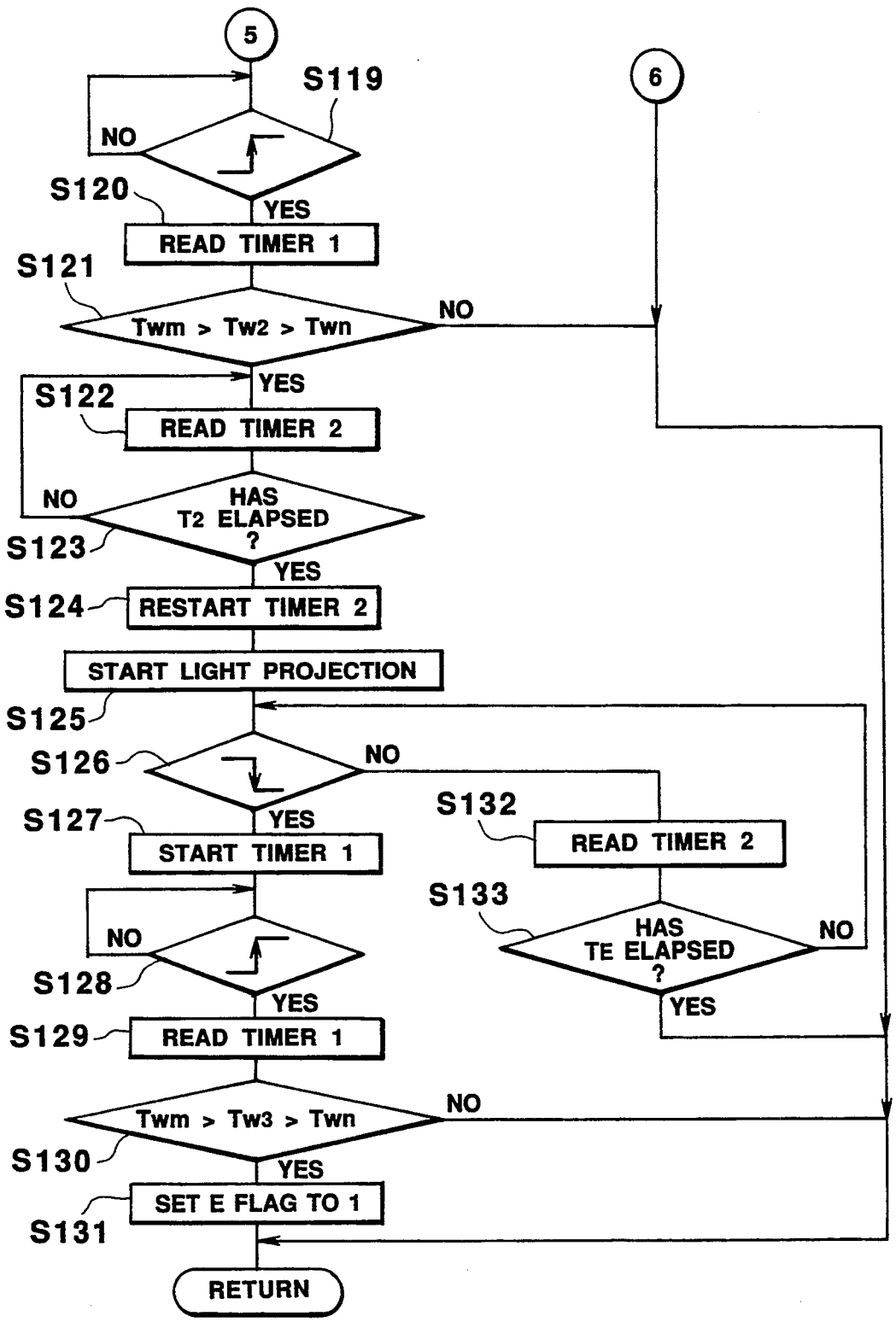
FIG. 17 is a flowchart showing a human body detection routine in the first embodiment of the present invention.

First, at a step S100 of FIG. 16, the E flag indicating the result of human body detection is reset to 0. Next, a timer 2 inside a CPU 60 is started, and light projection of an IRED 13 is also started, (steps S101 and S102). The IRED 13 projects light of a pulse train B1 shown in FIG. 7. Steps S103, S114, and S115 make up a loop for detecting the leading edge E1 of a pulse P1 in an output 39 of a detecting means 5. Unless the output 39 falls within a period TE from the start of light projection, control passes from the step S115 to ⑥. It is determined that a human body is not detected. Then, processing terminates. Then, control returns to the main routine shown in FIGS. 9 and 10.

On the other hand, when the trailing edge E1 is detected within the given period TE from the start of light projection, a timer 1 inside the CPU 60 is started at a step S104. Then, a period from the leading edge E1 to the leading edge of a pulse P1; that is, a pulse width Tw1 is detected (steps S105 and S106). At the next step S107, it is determined whether the pulse width Tw1 is smaller than Twm and larger than Twn. When Twm>Tw1>Twn is established, control passes to a step S108. If Twm>Tw1>Twn is not established, there is no reliability. Therefore, it is determined that a human body is not detected. Then, control passes to ⑥, then returns to the main routine.

Next, a count value of timer 2 which has counted up since the start of a pulse train B1 of light projected by the IRED 13 is read (step S108). When it is recognized that the given pulse spacing T2 has elapsed (step S109), the timer 2 is restarted. Then, the IRED 13 starts projecting light of a pulse train B2 (step S111). Steps S112, S116, and S117 make up a loop for detecting the leading edge E2 of a pulse P2 in the output 39 of the detecting means 5. Unless the output 39 falls within tile period TE from the start of light projection at the step S111, control passes from the step S117 to ⑥. It is determined that a human body is not detected. Then, control returns to the main routine.

When the leading edge E2 is detected within the given period TE from the start of light projection with the light projected pulse train B2, control passes from the step S112 to step S113. Then, the timer 1 inside the CPU 60 is started to start measuring a pulse width of a pulse P2. The measurement is carried out at steps S119, S120, and S121.

To be more specific, a rise of the pulse P2 is detected at the step S119, and the count value of the timer 1 is read at the step S120. The pulse width Tw2 of the pulse 2 corresponds to the count value. Therefore, it is determined at the step S121 whether the pulse width Tw2 falls within the threshold levels Twm and Twn (Twm>Tw2>Twn). When Twm>Tw2>Twn is established, control passes to a step S122. When Twm>Tw2>Twn is not established, it is determined that a human body is not detected. Then, control returns to the main routine.

The subsequent steps S122 to S130 correspond to the steps S108 to S121, which will, therefore, be described briefly. A spacing T2 from the light projected pulse train B2 to B3 is set at the steps S122 and S123, and light projection for the light projection pulse train B3 is started at the steps S124 and S125. Next, the leading edge E3 of a pulse P3 is detected in the output 39 of the detecting means 5 at the steps S126 through S132 to S133. Then, the pulse width Tw3 of the pulse P3 is checked at the steps S127 through S128 and S129 to S130. At the step S131, the E flag is set to 1 because human body detection is completed. Then, control returns to the main routine. When a human body is not detected, control returns to the main routine with the E flag reset to 0.

Figure 10:
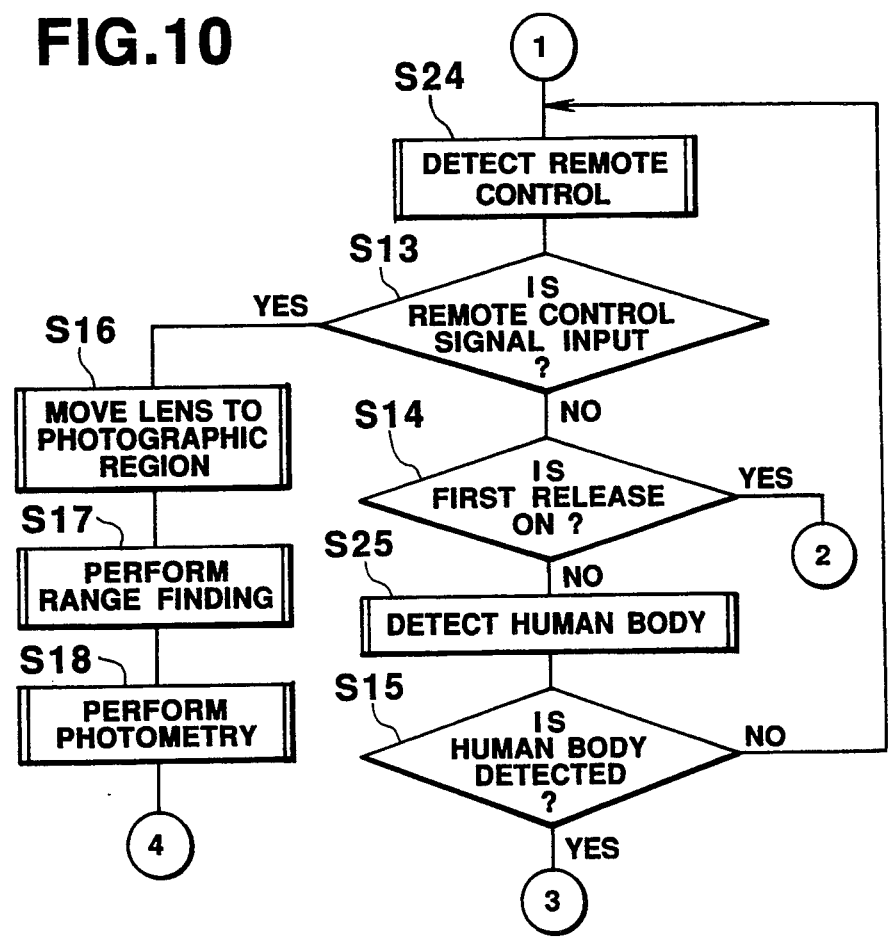
FIG. 10 is a flowchart of camera operations in the first embodiment.

In the loop of the steps S13, S14, and S15 in FIG. 10, higher priority Is given to remote control detection than to human body detection. A step S24 of a remote control detection routine, which is not shown, Is executed for each loop, while a step S25 of a human detection routine is executed once for every given number of the loops.

Next, a subroutine for performing remote control detection at a step S24 will be described with reference to FIGS. 18 and 19. Encircled numerals 7 and 8 at terminals in FIGS. 18 and 19 indicate correspondences between these drawings.

In a subroutine Remote Control Detection, when remote control is detected, an R flag is set to 1. When remote control is not detected, the R flag is reset to 0. In the flow of FIG. 10, the R flag is referenced at a step S13 to determine whether remove control is detected. Then, control is branched. In the subroutine Remote Control Detection, a given pulse spacing T1 based on a light projected signal (FIG. 5) sent from a transmitting means 1 shown in FIG. 4 is checked to detect remote control. Specifically, threshold levels $T_{Rm}$ and $T_{Rn}$, which have a relationship of $T_{Rm}>T1>T_{Rn}$ with respect to T1, are specified. Then, when $T_{Rm}>Tx$ and $Ty>T_{Rn}$ are established, the pulse spacing is recognized as T1. For determining whether or not pulses P1 to P3 are required pulses, threshold levels Twm and Twn having a relationship of Twm>Twn are specified with respect to each of the pulse widths Tw1, Tw2, and Tw3. Then, whether Twm>Tw1, Tw2, Tw3>Twn is established is detected.

Figure 18:
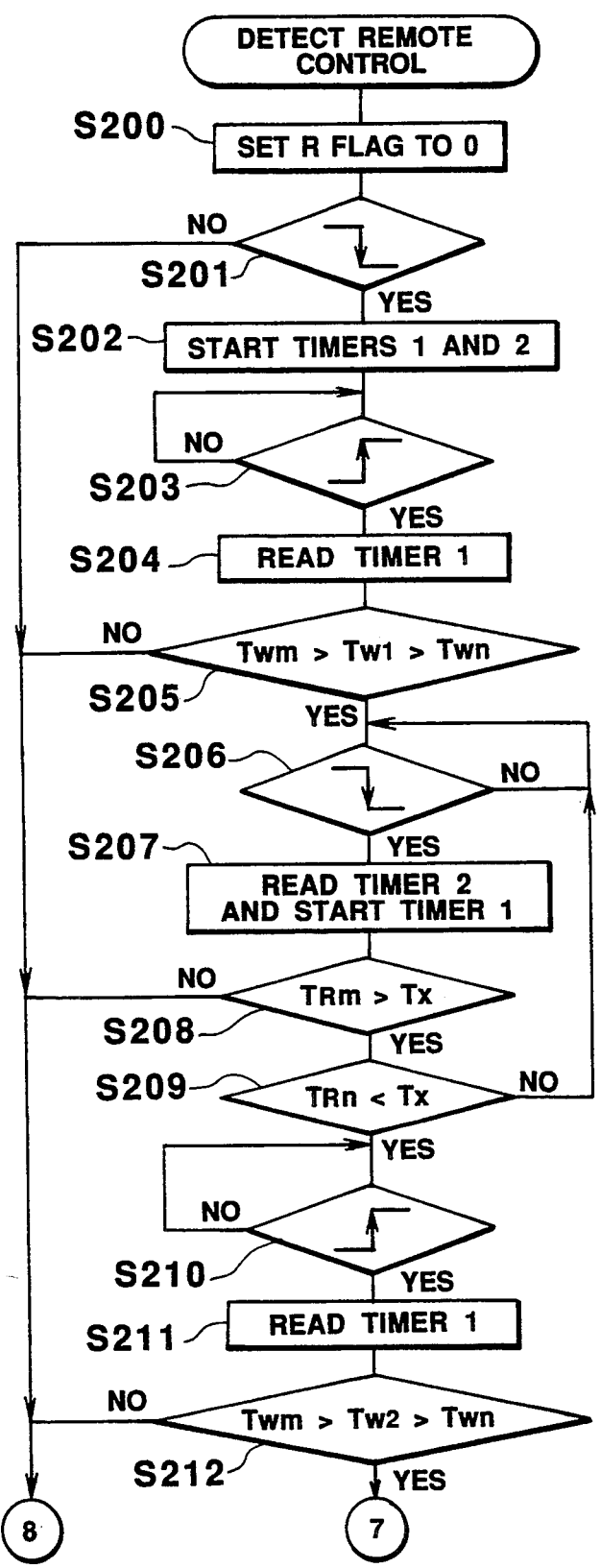
FIG. 18 is a flowchart showing a remote control detection routine in the first embodiment of the present invention.
Figure 19:
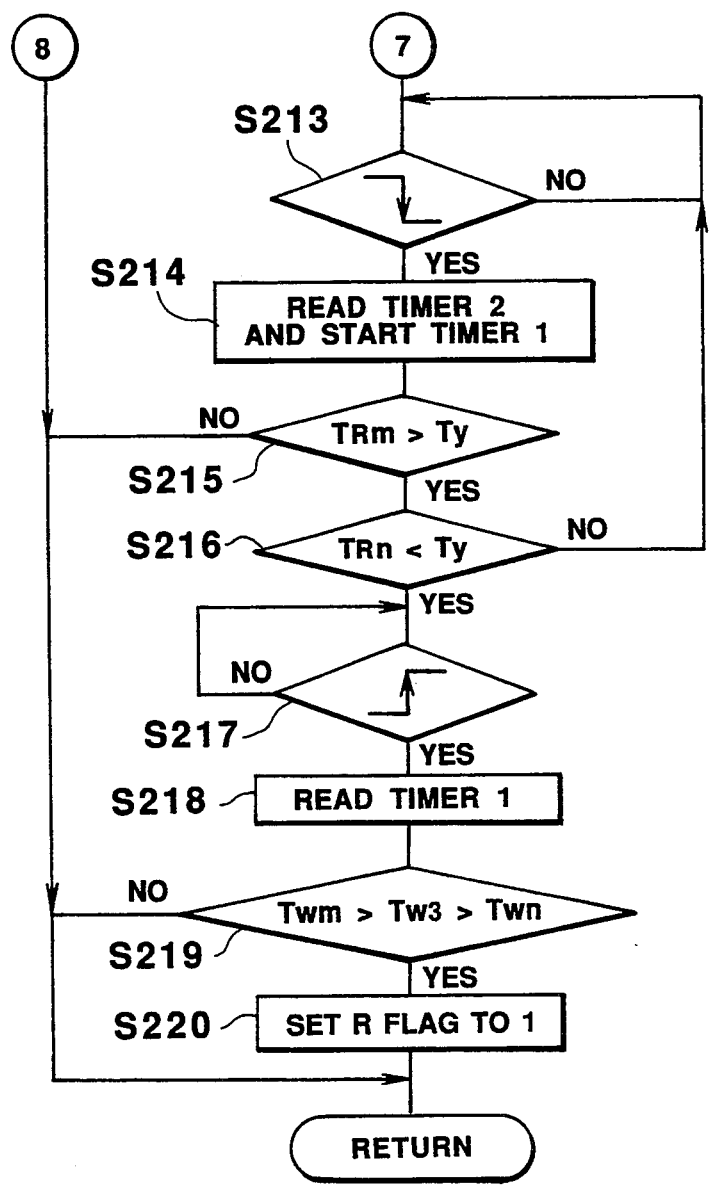
FIG. 19 is a flowchart showing a remote control detection routine in the first embodiment of the present invention.

Within the subroutine Remote Control Detection, first, the R flag; that is, a remote control detection flag is reset to 0 at a step S200 in FIG. 18. Next, at a step S201, the leading edge E1 of a pulse P1 is waited to appear in an output 39 of a detecting means 5, which is shown in FIG. 8F. If the leading edge E1 is not found, control passes to ⑧ and returns to the main routine of FIG. 10. When the leading edge E1 is found, timers 1 and 2 inside a main CPU 60 are started (steps S201 and 202). Then, the pulse P1 is waited to rise (step S203). When the rise is detected, the count value Tw1 of the timer 1 is read (step S204). Whether or not the pulse width Tw1 of the pulse P1 is equal to a given pulse width is determined using the threshold levels Twm and Twn. Unless Twm>Tw1>Twn is met, the pulse P1 is recognized as a noise. Then, control returns to the main routine via ⑧ (step S205).

When Twm>Tw1>Twn is met, the input of the next pulse P2 (trailing edge E2) is waited (step S206). Then, the count value Tx of the timer 2 is read and the timer 1 is restarted (step S207). Then, it is determined whether Tx that is a pulse spacing between the pulses P1 and P2 exceeds the upper threshold level $T_{Rm}$. If Tx exceeds $T_{Rm}$, the pulse P2 is not a normal signal pulse. Therefore, control returns to the main routine via ⑧.

When $T_{Rm}>Tx$ is established, it is determined at the next step S209 whether Tx is larger than the lower threshold level $T_{Rn}$. If $T_{Rn}$ is larger than or equal to Tx, the pulse P2 is recognized as a noise. Processing is resumed from the step S206, and detecting the pulse P2 is resumed (step S209). If $T_{Rm}>Tx>T_{Rn}$ is met, the pulse P2 is waited to rise (step S210). When a rise is input, the count value Tw2 of the timer 1 is read (step S211). Whether or not the pulse width Tw2 of the pulse P2 is equal to a given pulse width is determined through comparison similar to that of the pulse P1 at the step S212. When the pulse P2 is recognized as a noise, control returns to the main routine vie ⑧.

Next, control passes to a step S213 via ⑦. The pulse spacing Ty between the pulses P2 and P3 is determined at the steps S213 to S216, and the pulse width TW3 of the pulse P3 is determined at steps S217 to S219. When the pulse P3 is recognized as a remote control detected signal at the step S219, the R flag is set to 1 at a step S220. Remote Control Detected is put in memory. Then, control returns to the main routine. When remote control is not detected at the step S219, control returns to the main routine with the R flag reset to 0.

Assuming that a remote control signal is not input at the step S24 in FIG. 10, processing is advanced from the step S13 to the step S14. Then, it is determined whether First release is on. Then, a photographer's action of looking into a viewfinder is detected (step S15). In the meantime, the input of a remote control signal is waited. When the standby loop made up of the steps S13 to S15 is running, If first release is turned on, control passes to the step S19 via ②) as described previously. When a photographer's action of looking into the viewfinder is detected, control passes to the step S4 via ③.

As described above, according to the first embodiment, an output of a first light-receiving means 2 for receiving remote control signal light, and an output of a second light-receiving means 3 for human body detection are decoded by the same detecting means 5. In other words, the detecting means 5 serves as both a remote control detecting circuit and an eye start detecting circuit. Therefore, the circuitry can be downsized to realize cost saving.

Figure 11:
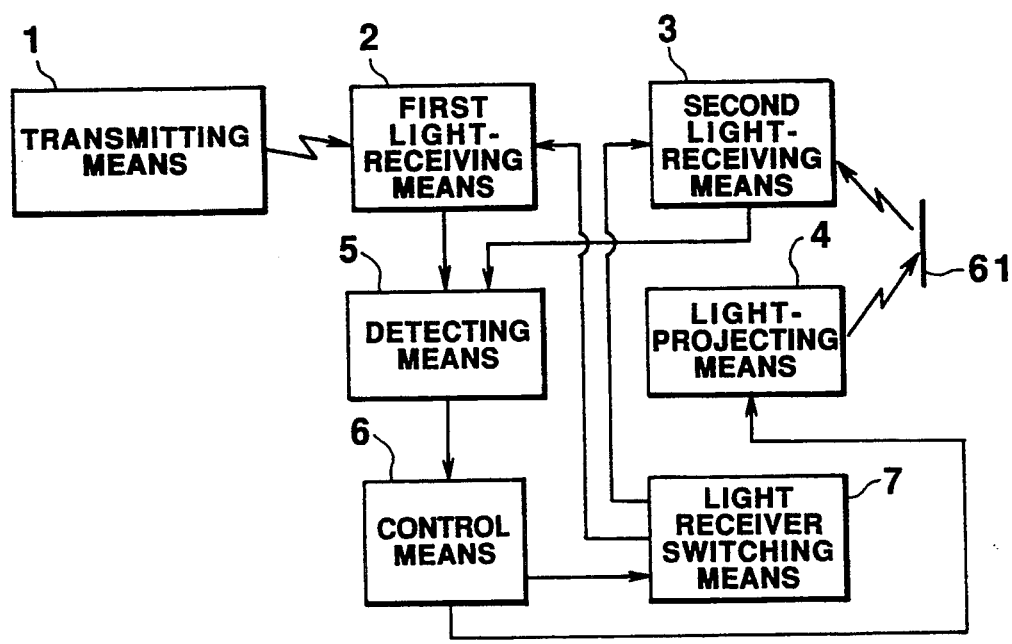
FIG. 11 is a block construction diagram of a major portion of a camera representing the second embodiment of the present invention.

FIG. 11 is a block construction diagram of a major portion of a camera representing the second embodiment of the present invention. In the first embodiment, remote control signal light and human body detection signal light may be received overlapped. In the second embodiment, either of these light signals is received selectively. FIG. 11 has no difference from FIG. 1 of the first embodiment, except that a light receiver switching means 7 is added. The same component members are assigned the same numerals. The description will be omitted. The light receiver switching means 7 alone will be described.

In response to a switching signal for switching between a first light-receiving means 2 and a second light-receiving means 3, which is applied by a control means 6, the light receiver switching means 7 activates either the first light-receiving means 2 or the second light-receiving means 3 and inactivates the other means.

Figure 12:
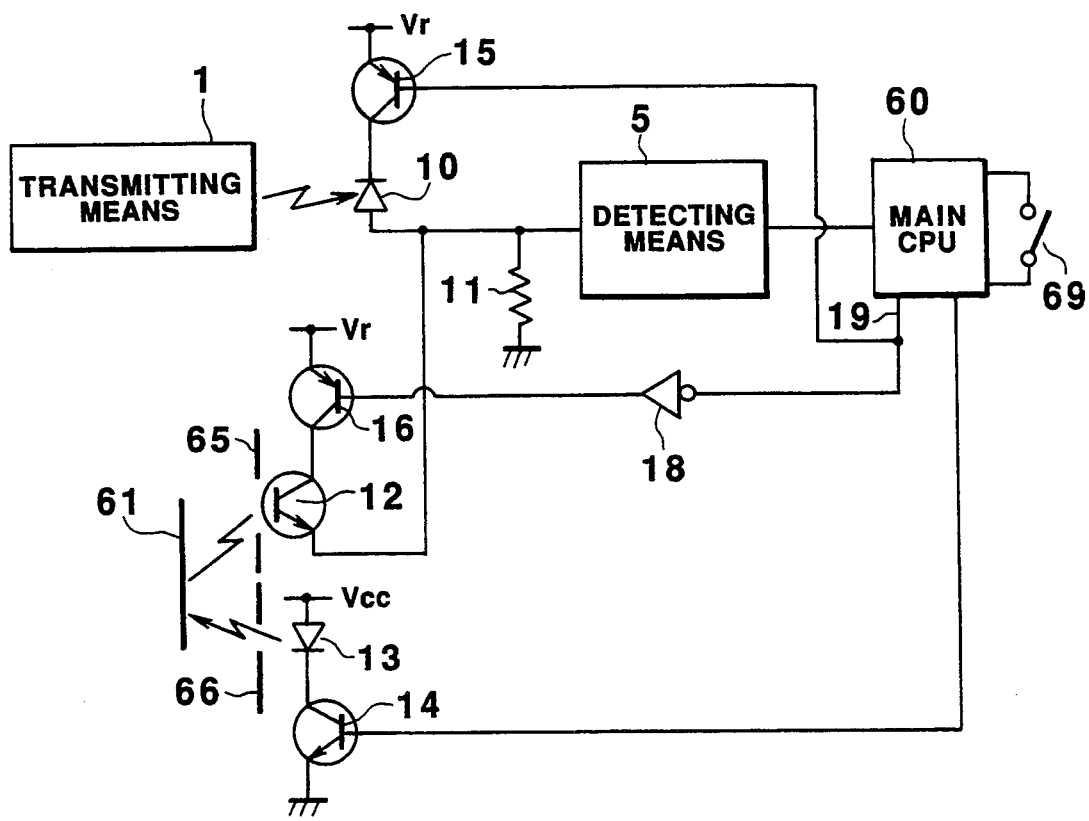
FIG. 12 is a block construction diagram showing the details of the first and second light-receiving means and light-projecting means shown in FIG. 11.

The electric circuitry of a whole camera is identical to that shown in FIG. 2. The description will be omitted. The peripheral circuits relating to the light receiver switching means 7 will be described in conjunction with FIG. 12. FIG. 12 is a block diagram corresponding to FIG. 6 for the first embodiment. The same component members are assigned the same numerals. The description will be omitted.

A cathode of a photodiode 10 is connected to a collector of a PNP transistor 15, and an emitter of the transistor 15 is connected to a stabilized constant-voltage source Vt. A base of the transistor 15 is controlled with an output 19 of a main CPU 60. On the other hand, a collector of a phototransistor 12 is connected to a collector of a PNP transistor 16, and an emitter of the transistor 16 is connected to the stabilized constant-voltage source Vr. The output 19 of the main CPU 60 is supplied to a base of the transistor 16 via an inverter 18. The active and inactive states of the PNP transistors 15 and 16 are switched with the output 19 of the main CPU 60. That is to say, the main CPU 60 switches the active and inactive states of the photodiode 10 and phototransistor 12. The CPU 60 switches the active and inactive states in accordance with the on or off state of a select switch 69.

The operations of the second embodiment having the aforesaid construction will be described according to the flowchart of FIG. 13 that is paired with FIG. 9. The operations in FIG. 9 are identical to those for the first embodiment. The description will be omitted. Encircled numerals 1, 2, and 4 at terminals in FIG. 13 correspond to the same numerals at terminals in FIG. 9.

Figure 13:
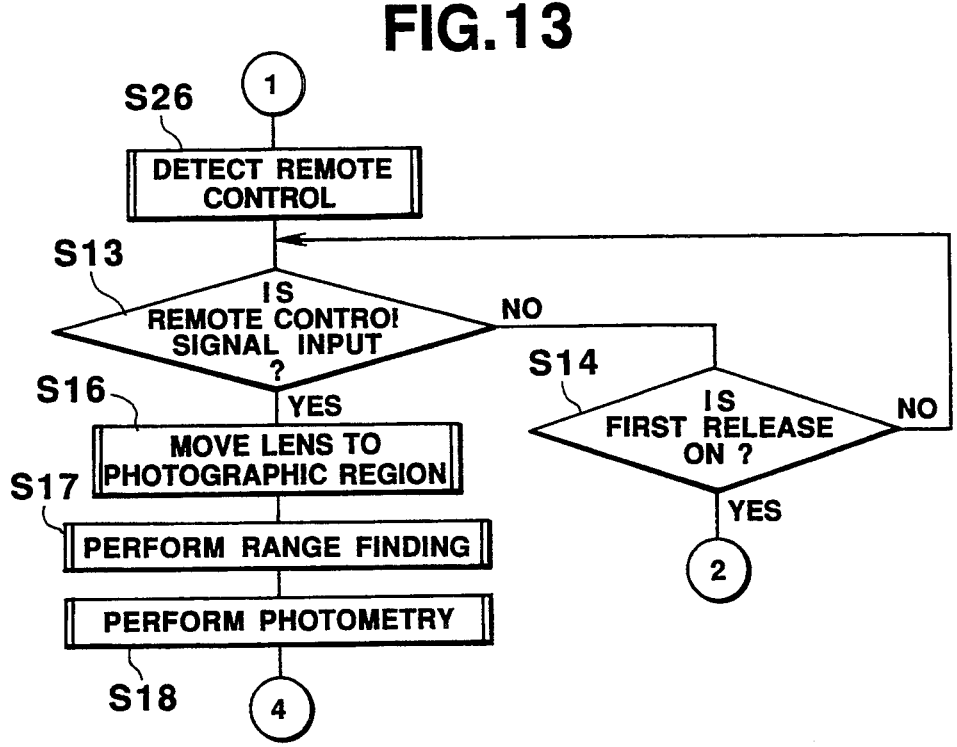
FIG. 13 is a flowchart of a major portion of camera operations in the second embodiment.

FIG. 13 is a flowchart of operations performed when a remote control mode is designated. When the remote control mode is designated, a main CPU 60 in FIG. 12 drives its output 19 to low in accordance with the state of a select switch 69, turns on a PNP transistor 15 for controlling remote control, and turns off a PNP transistor 16 for controlling human body detection. That is to say, a photodiode 10 alone is activated, and a human body detection phototransistor 12 is inactivated. The main CPU 60 stops light projection of an IRED 13. This is intended to ensure high detection sensitivity for a remote control signal even with high luminance, which will be described later.

As shown in FIG. 13, in remote control mode, human detection is not carried out. Input of a remote control signal is detected at steps S26 and S13, and first release is detected at a step S14. When the main CPU 60 has selected the phototransistor 12, the main CPU 60 may output a synchronizing signal to a detecting means 5 in synchronization with light projection of the IRED 13, and detect synchronism.

When the photodiode 10 and phototransistor 12 are activated simultaneously, light current flows from the photodiode 10 and phototransistor 12 into a load resistor 11. With high luminance, the light current increases to saturate the input of the detecting means 5, or a shot noise increases to disable detection of a remote control signal or a human body detection signal. In an effort to prevent the saturation with high luminance, the resistance of the load resistor 11 may be set low. This, however, deteriorates detection sensitivity, and eventually shrinks the range of a remote control signal.

In the second embodiment, the photodiode 10 serving as a first light-receiving means and the phototransistor 12 serving as a second light-receiving means are switched to activate one of them and inactivate the other. Only the current flowing through only one of the photodiode 11 and phototransistor 12 should be taken into consideration as light current of fixed light when luminance is high.

As described above, according to the second embodiment, the resistance of the load resistor 11 can be set high to improve detection sensitivity. In the first embodiment, the signal patterns of a remote control signal and a human body detection signal must be specified differently as shown in FIGS. 5 and 7. In the second embodiment, a common signaling pattern is employed to simplify software.

To be more specific, depending on the setting of a timer of hardware inside a main CPU 60, an IRED 13 for human body detection generates pulse trains A1, A2, and A3 that are identical to those of a remote control signal shown in FIG. 5. Thereby, a human body detection routine is replaced with a remote control detection routine shown in FIGS. 18 and 19. Thus, the same software is shared for human body detection and remote control detection.

Figure 14:
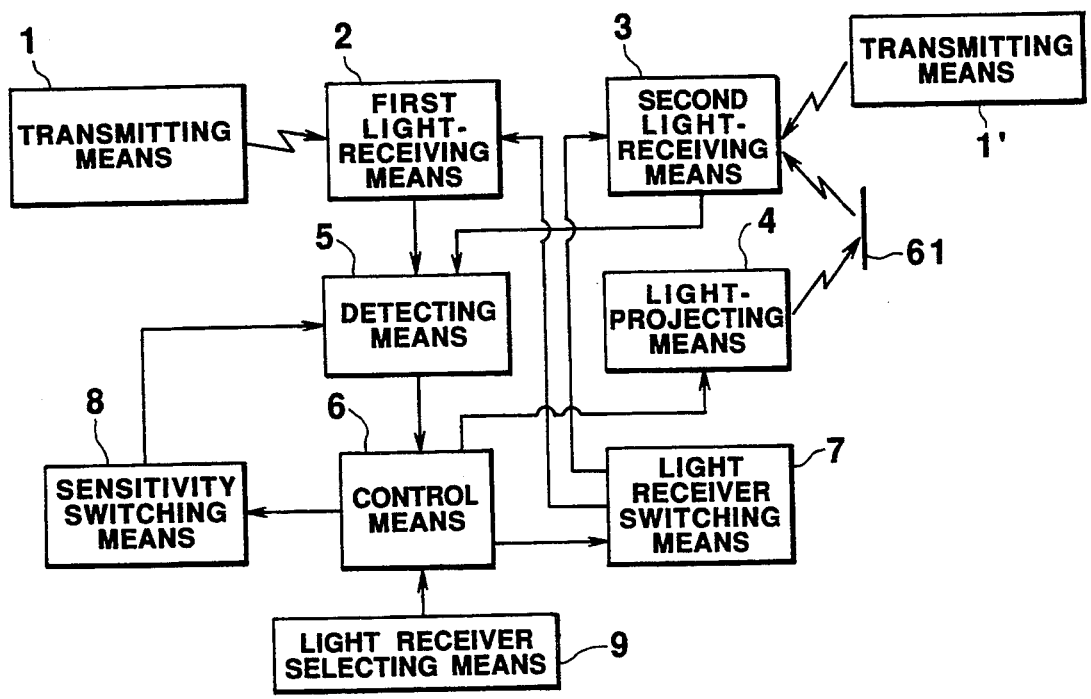
FIG. 14 is a block construction diagram of a major portion of a camera representing a third embodiment of the present invention.

FIG. 14 is a block construction diagram of a major portion of a camera representing the third embodiment of the present invention. In the first and second embodiments, a first light-receiving means 2 located on the front of a camera is used to receive remote control signal light from a transmitting means 1, thus enabling remote control. A light-projecting means 4 and a second light-receiving means 3, which are located on the back of the camera, are used to detect a human body. By contrast, in the third embodiment, the second light-receiving means 3 can receive remote control signal light from a transmitting means 1' located behind the camera, and be actuated using, for example, a cable release switch. This is a difference from the first and second embodiments.

According to the layout of light-receiving means shown in FIG. 3, a second light-receiving means 3 must be able to receive remote control signal light from a transmitting means 1' located behind a camera instead of a transmitting means 1 located ahead of the camera, and to enable remote control. However, a quantity of light received by a phototransistor 12 serving as the second light-receiving means 3 is limited by a diaphragm 65 (See FIG. 6) to such an extent that light reflected from an IRED 13 serving as a light-projecting means 4 will be received optimally to enable human body detection. Therefore, the range of remote control signal light from behind the camera is quite limited.

In the third embodiment shown in FIG. 14, a sensitivity switching means 8 and a light receiver selecting means 9 are added to the circuits in the second embodiment shown in FIG. 11. Except the addition of these means, FIG. 14 has no difference from FIG. 11. The same component members are assigned the same numerals. The description will be omitted. Only the different members will be described.

In an effort to expand a remotely controllable range at a place far behind a camera, when a light receiver selecting means 9, which enables selection of either a first light-receiving means 2 or a second light-receiving means 3 when a photographer designates a remote control mode, selects the second light-receiving means 3, a light receiver switching means 7 activates the second light-receiving means 3, and a sensitivity switching means 8 sets the detection sensitivity of a detecting means 5 to a level most suitable for the second light receiving means 3 to receive remote control signal light.

Figure 15:
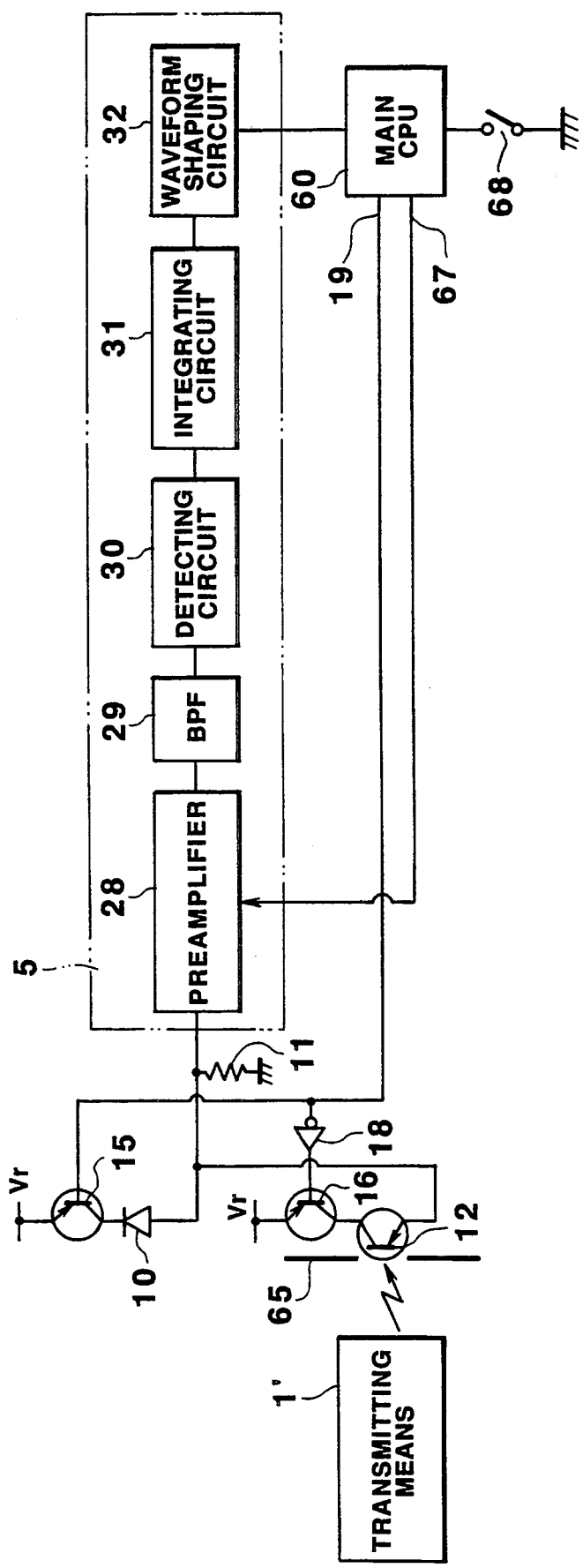
FIG. 15 is a block construction diagram showing the details of the first and second light-receiving means and light-projecting means shown in FIG. 14.

FIG. 15 is a block diagram showing a major portion of the third embodiment more specifically. In FIG. 15, component members identical to those in FIG. 12 are assigned the same numerals. The description will be omitted. Only different members will be described. A light receiver selecting means 9 is realized as a switch 68 in FIG. 15. The on or off state of the switch 68 is detected by a main CPU 60. The main CPU 60 detects the state of the switch 68 in remote control mode, and provides an output 19 to activate one of a photodiode 10 serving as a first light-receiving means or a phototransistor 12 serving as a second light-receiving means, and to inactivate the other.

When the phototransistor 12 is selected, the output 19 of the main CPU 60 is driven high, a PNP transistor 16 is turned on, and the phototransistor 12 is activated. At the same time, the main CPU 60 provides a sensitivity switching signal as an output 67 in order to vary the voltage gain of a preamplifier 28 in a detecting means 5. Thus, the sensitivity is set optimally for receiving a remote control signal. In this embodiment, the voltage gain of the preamplifier in the detecting means 5 is varied to change the detection sensitivity. Alternatively, the voltage gain of a BPF 29 or the threshold levels $V_{TH1}$ and $V_{TH2}$ of a waveform shaping circuit 32 may be varied.

According to the third embodiment, similar to the first embodiment, since one circuit serves as a remote control detecting circuit and an eye start detecting circuit, the circuitry can be downsized to realize cost saving. Detection of a remote control signal or detection of a human body is performed selectively. Therefore, the resistance of a load resistor 11 can be set to a high value. This leads to improvement of detection sensitivity. Moreover, since the same signaling pattern is used in common for both a remote control signal and a human body detection signal, the same software installed a main CPU 60 can be shared for remote control detection and human body detection. These advantages are identical to those of the second embodiment. In addition, a second light-receiving means 3 located on the back of a camera can receive a remote control signal from a transmitting means 1'. This expands a usable range of remote control. Since a camera can be controlled remotely far behind the camera, an animal or a child, for example, can be photographed secretly without alerting it.

In the present invention, it will be apparent that a wide range of different embodiments can be formed on the basis of the present invention without departing from the spirit and scope of the invention. This invention will be limited to the appended claims but not restricted to any specific embodiments.

What is claimed is:

1. A camera control unit, comprising:
   a remote controller for remotely controlling camera operations;
   a first light-projecting means incorporated in said remote controller for transmitting a first light signal;
   a first light-receiving means installed on a front portion of a camera body for receiving said first light signal;
   a second light-projecting means installed on a back portion of a camera body for transmitting a second light signal whose state differs from that of said first light signal;
   a second light-receiving means installed on a back portion of a camera body for receiving light of said second light signal reflected from a camera user;
   a detecting means connected to said first light-receiving means and to said second light-receiving means, and that determines which has been input; a first light signal or a second light signal, and provides an output; and
   a control means that receives an output of said detecting means and controls the operations of a camera.

2. A camera control unit according to claim 1, wherein said first light signal and second light signal are pulsed light having different generation patterns.

3. A camera control unit, comprising:
   a first light-projecting device for transmitting a first light signal for remotely controlling a camera;
   a first light-receiving device installed in a camera body for receiving said first light signal to generate a given output;
   a second light-projecting device installed in said camera body for transmitting a second light signal for operating a camera;
   a second light-receiving device installed in said camera body for receiving said second light signal to generate a given output;

a detecting circuit for generating a given output responsive to said given output of said first light-receiving device and said given output of said second light-receiving device; and a control circuit for enabling operation of the camera to perform photorgraphing responsive to receiving a given output from said detecting circuit.

4. A camera control unit according to claim 3, wherein said first light signal is a pulse train comprising a given number of pulses, and the pulse train is pulsed light occurring at first time intervals; and said second light signal is a pulse train consisting of a given number of pulses, and the latter pulse train is pulsed light occurring at second time intervals.

5. A camera control unit according to claim 3, wherein said first light-receiving means is installed on a front portion of a camera body, and said second light-receiving means is installed in a vicinity of an eyepiece unit of a viewfinder in a rear portion of the camera body.

6. A camera control unit according to claim 3 wherein said first light projecting means and said second light receiving means are arranged on portions of said camera body to prevent said second light receiving means to receive light from said first light projecting means.

7. A camera control unit according to claim 3 further comprising ranging means for determining the distance of an object to be photographed, said ranging means being independent of said first and second transmitting light projecting and light receiving devices.

8. A camera control unit, comprising:

a remote controller for remotely controlling camera operations;

a first light-receiving means incorporated in said remote controller for transmitting a first light signal;

a first light-receiving means installed on a front portion of a camera body for receiving said first light signal;

a second light-projecting means installed on a back portion of a camera body for transmitting a second light signal;

a second light-receiving means installed on the back of a camera body for receiving light of said second light signal reflected from a camera user;

a switching means that selectively activates one of said first light-receiving means and said second light-receiving means;

a detecting means connected to said first light-receiving means and to said second light-receiving means; and a control means receiving an output of said detecting means for controlling operations of a camera.

9. A camera control unit, comprising:

a remote controller for remotely controlling camera operations;

a first light-projecting means incorporated in said remote controller for transmitting a first light signal;

a first light-receiving means installed on a front portion of a camera body for receiving said first light signal;

a second light-projecting means installed on a back portion of a camera body for transmitting a second light signal;

a second light-receiving means installed on a back portion of the camera body for receiving one of light from said second light signal reflected from a camera user and said first light signal;

a selecting means for activating one of said first light-receiving means and said second light-receiving means;

a detecting means connected in common to said first light-receiving means and to said second light-receiving means;

a means for switching the sensitivity of said detecting means in accordance with an output of said selecting means; and a control means for receiving an output of said detecting means and controlling operations of the camera.

10. A camera control unit, comprising:

a remote controller for remotely controlling camera operations;

a first light signal generating means incorporated in said remote controller;

a first light-receiving means installed on a front portion of a camera body for receiving a light signal from said first light signal generating means;

a second light signal generating means installed on a back portion of the camera body;

a second light-receiving means installed on a back portion of the camera body for receiving light, which has been provided by said second light signal generating means, reflected from a camera user;

a detecting means connected in common to said first light-receiving means and to said second light-receiving means, for determining which light signal has been input; a first light signal or a second light signal, and providing an output; and a control means for receiving an output of said detecting means and controlling operations of the camera.

11. A camera control unit, comprising:

a remote controller for remotely controlling camera operations;

a first signal generating means incorporated in said remote controller;

a first receiving means installed on a front portion of a camera body for receiving a signal from said first signal generating means;

a second signal generating means installed on a back portion of the camera body;

a second receiving means installed on a back portion of the camera body for receiving a signal, which has been provided by said second signal generating means, reflected from a camera user;

a detecting means connected in common to said first receiving means and to said second receiving means, for determining which light signal has been input; a first signal or a second signal, and provides an output; and a control means for receiving an output of said detecting means and controlling operations of the camera.

12. A camera, comprising:

a first light-receiving element for receiving infrared light projected by a remote control unit and outputting a light current signal;

a light-projecting element for projecting infrared light away from a back of a camera body;

a second light-receiving element for receiving infrared light, which has been projected by said light-projecting element, reflected from a photographer's face;

a converting circuit connected to said first and second light-receiving elements for converting light current signals output by said two light-receiving elements into digital pulse signals; and a control means connected to said converting circuit, to determine from which light-receiving element a digital pulse signal results; an output of said first or second light-receiving element, and controlling subsequent camera operations in accordance with a result of the determination.

13. A camera according to claim 12, wherein said light-projecting element and said second light-receiving element are installed in a vicinity of an eyepiece unit of a viewfinder on the camera.

14. A camera according to claim 12, wherein said control means determines from which light receiving element the digital pulse signal results; an output of said first or second light-receiving element, depending on a pulse spacing of a digital pulse signal fed to said control means.

15. A camera, comprising:
a first signal output means for receiving remote control signal light and outputting a release signal responsive thereto;
a second signal output means for detecting a photographer's action of looking into a viewfinder on the camera and outputting a control signal; said means including a light-projecting means and a light-receiving means, which are installed on a back portion of a camera body, said control signal being outputted when said light-receiving means receives light, which has been projected by said light-projecting means, reflected from a photographer's face; and
a control means for executing a release operation in response to a release signal, and executing a photography preparation in response to said control signal; and
said first signal output means and said second signal output means sharing at least part of their components.

16. A camera, comprising:
a first light-receiving means for receiving remote control signal light from a remote control transmitting apparatus and outputting an electric signal responsive thereto;
a light-projecting means for projecting human body detection light in a rearward direction from a camera body;
a second light-receiving means for receiving light of said human body detection light reflected from a photographer's face and outputting an electric signal responsive thereto;
a signal processing means including a common waveform shaping means for shaping waveforms of outputs of said first and second light-receiving means;
a determining means for determining from which light receiving means an output of said waveform shaping means results; an output of said first or second light-receiving means; and
an executing means for executing given operations in accordance with a result of a determination made by said determining means.

17. A camera, comprising:
a first light-receiving means for receiving remote control signal light from a remote control transmitting apparatus and outputting an electric signal responsive thereto;
a light-projecting means for projecting human body detection light in a rearward direction from a camera body;
a second light-receiving means for receiving light of said human body detection light reflected from a photographer's face and outputting an electric signal responsive thereto;
a signal processing means including a common waveform shaping means for shaping waveforms of outputs of said first and second light-receiving means;
a means for selectively activating one of said first and second light-receiving means in accordance with a designated operation mode; and
an executing means that executes given operations in response to an output of said signal processing means.

18. A method for operating a camera comprising:
a controller producing a first control signal for remotely controlling operation of the camera;
first light-receiving means installed on the camera for receiving a control signal for the remote controller;
light-projecting means generating a second control signal and second light-receiving means receiving said second control signal mounted on said camera for detecting the presence of a camera user, said method comprising the steps of:
(a) receiving an output from a common terminal coupled to both of said first and second light-receiving means;
(b) determining which of the receiving means has been activated; and
(c) performing a camera operation according to the activated receiving means.

19. The method of claim 18 wherein signals generated by said controller and said light-projecting means are different and wherein step (b) further comprises the step of:
(d) comparing the received signal against predetermined criteria to determine which of the two signals have been received.

20. The method of claim 19 wherein step (b) further comprises the step of converting the output at said common terminal into digital signals preparatory to a comparison operation.

21. The method of claim 19 wherein the first and second signals comprise pulses of predetermined pulse width and spacing wherein at least one of the pulse width and spacing of said first and second control signals is different, step (d) further comprising the steps of:
determining the pulse width and spacing of the received signal and comparing them against predetermined criteria for determining which of the signals is present.

22. The method of claim 21 further comprising the step of:
determining that the received signal is invalid when the pulse width and pulse interval of the received signal fail to conform to the predetermined criteria.

23. The method of claim 18 wherein the signal generated by said controller and said camera mounted signal generating means is comprised of a predetermined number of pulses, step (b) further comprising the step of:
determining which of the receiving means has been activated when the proper number of pulses is present.

24. The method of claim 18 wherein the camera is provided with a mode selection switch for selecting a controller mode, said method further comprising the step of:

activating only one of said light-receiving means responsive to the state of the mode selecting switch.

25. The method of claim 24 wherein step (d) further comprises:

disabling the second signal receiving means when the remote mode is selected; and activating the first light-receiving means when the remote mode is not selected.

26. The method of claim 24 wherein the first and second signals are the same and step (b) further comprises the steps of:

(d) comparing the received control signal against predetermined criteria; and (e) determining which signal is present according to the state of the mode selecting switch when the received control signal meets said criteria.

* * * * *